No. 740,532. PATENTED OCT. 6, 1903.
E. T. CLEATHERO.
CONTROL FOR SHEET FEEDERS.
APPLICATION FILED MAY 26, 1902.
NO MODEL. 7 SHEETS—SHEET 1.

Fig.1.

Witnesses.
Horace Grellier.
Warwick H. Williams.

Inventor
Edward Thomas Cleathero.
per Chas. S. Woodroffe
Attorney

Fig. 2.

No. 740,532. PATENTED OCT. 6, 1903.
E. T. CLEATHERO.
CONTROL FOR SHEET FEEDERS.
APPLICATION FILED MAY 26, 1902.
NO MODEL. 7 SHEETS—SHEET 7.

No. 740,532. Patented October 6, 1903.

UNITED STATES PATENT OFFICE.

EDWARD THOMAS CLEATHERO, OF ALTRINCHAM, ENGLAND.

CONTROL FOR SHEET-FEEDERS.

SPECIFICATION forming part of Letters Patent No. 740,532, dated October 6, 1903.

Application filed May 26, 1902. Serial No. 109,026. (No model.)

*To all whom it may concern:*

Be it known that I, EDWARD THOMAS CLEATHERO, residing at The Hollies, Barrington road, Altrincham, in the county of Chester, England, have invented certain new and useful Improvements in Control for Sheet-Feeders, of which the following is a true, full, and clear description, such as will enable others skilled in the art to which it appertains to make and use the same.

This invention has for its general object to provide improved mechanism for automatically controlling the working of automatic sheet-feeders which successively supply individual sheets to printing and other machines. This object is attained by providing means which when either a "double" occurs or a sheet fails to reach the feed-table at the proper time effects the stoppage of the feeder and maintains it stopped until the double has ceased to exist or the regular supply of sheets to the feed-table has been resumed. These means may be advantageously connected with the control mechanism of the printing-machine, whereby the latter is stopped by the same motion.

As a convenient example the invention is hereinafter described in connection with a machine for printing on sheets of paper, because there are, it is believed, more of that class of machine fitted with automatic sheet-feeders than of any other. The invention, however, is neither limited to any particular class of machine served by the sheet-feeder nor to the material of which the sheets are composed.

In the accompanying drawings, which are to be taken as part of this specification and read therewith.

Throughout the different figures of the drawings like numerals of reference are used to indicate the same parts.

Figure 1:
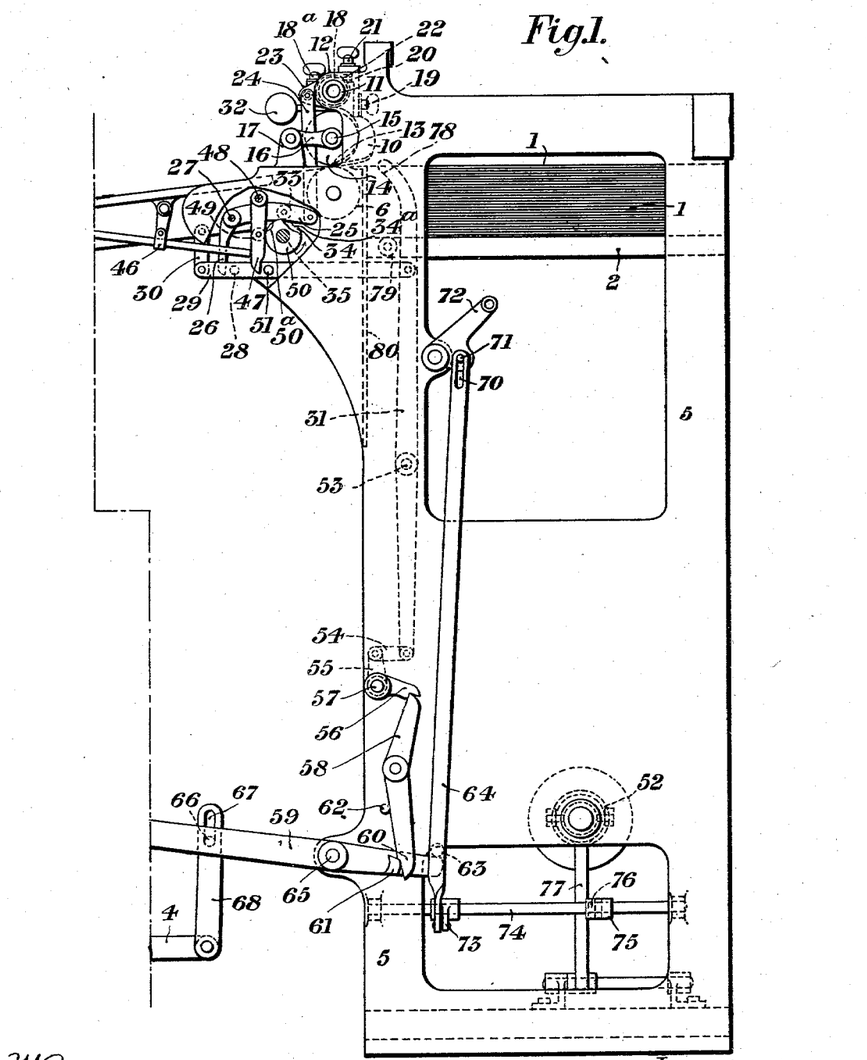
Figure 1 is the right-hand part, and Fig. 1ª the left-hand part, of a side elevation, partly broken away, of sufficient of one of the improved sheet-feeders to show the present improvements therein.
Figure 2:
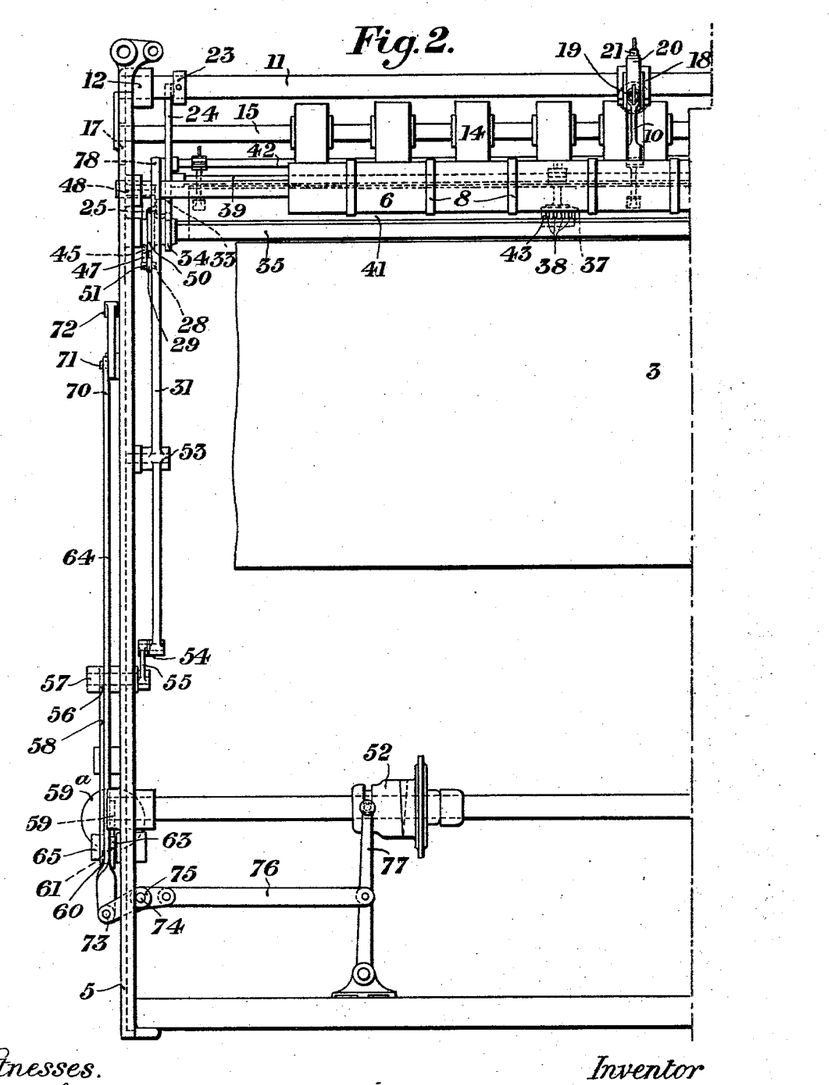
Fig. 2, the left-hand part, and Fig. 2ª the right-hand part, of an end elevation.
Figure 2A:
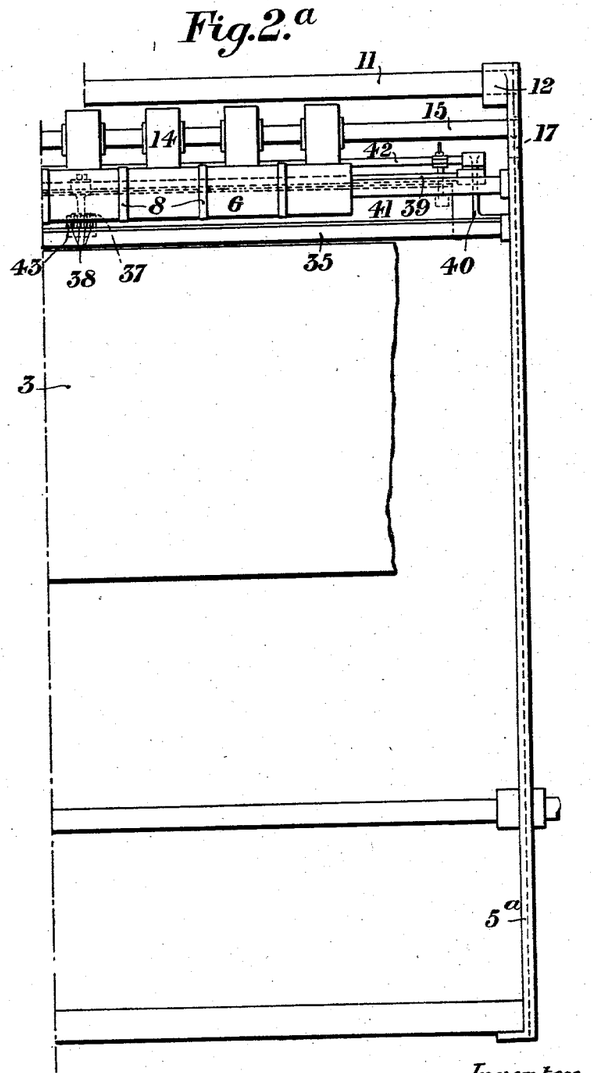
Figure 3:
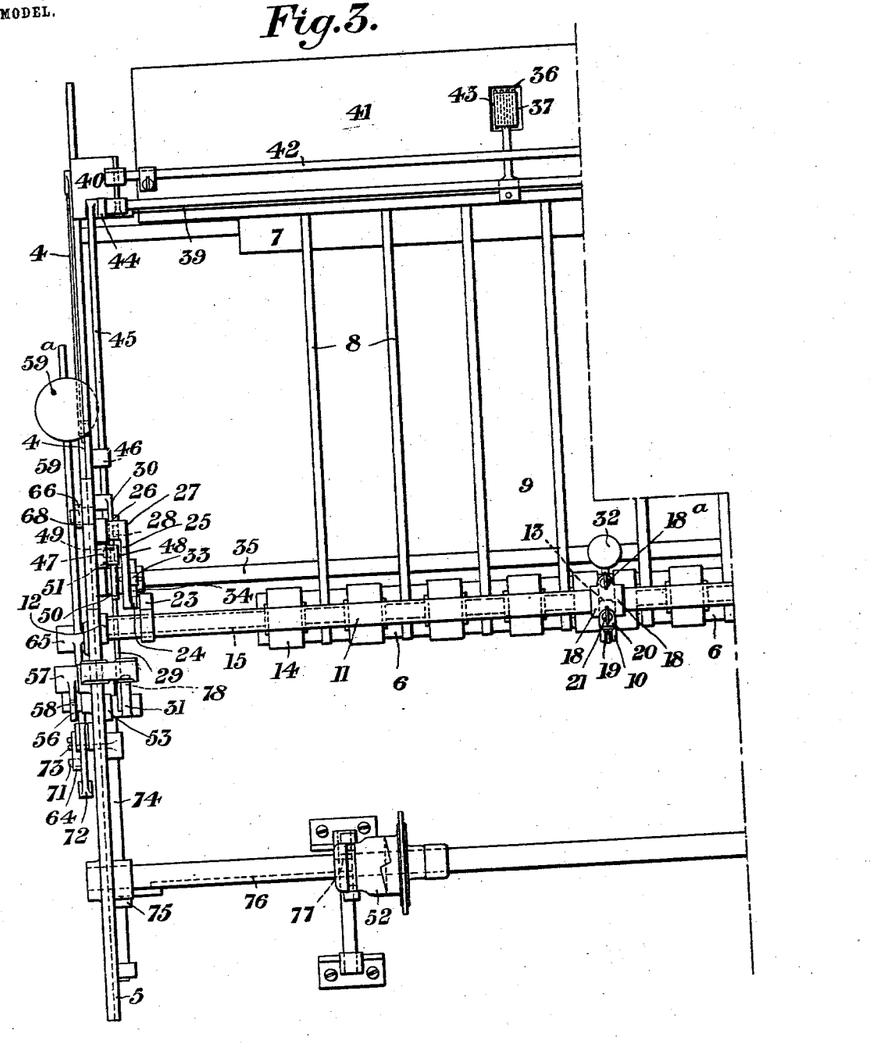
Fig. 3, the left-hand part, and Fig. 3ª the right-hand part, of a plan of Fig. 1.
Figure 4:
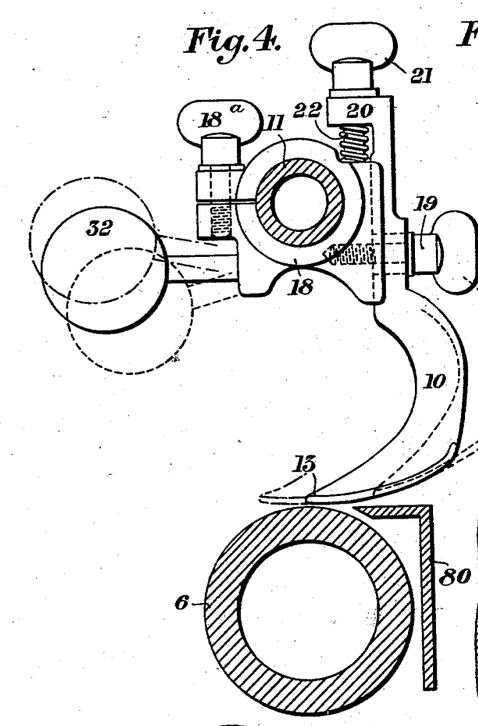
Fig. 4, a sectional elevation, Fig. 5 a front elevation, and Fig. 6 a plan, of detached parts of the machine drawn to a scale larger than that to which the other figures are drawn.
Figure 5:
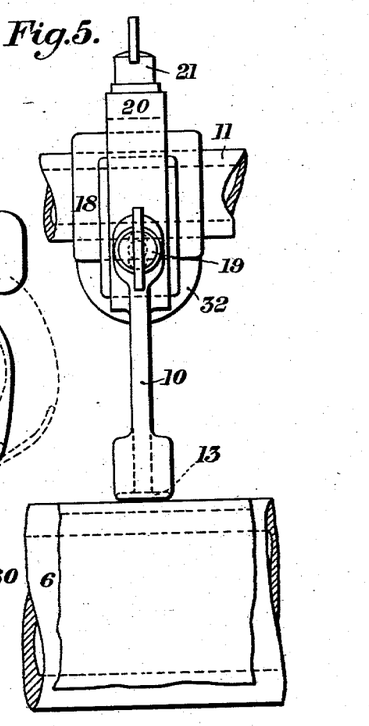
Figure 6:
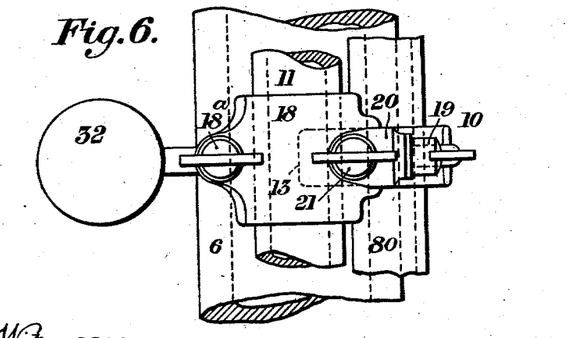

The sheets 1 1 of the paper to be fed to the printing-machine by the automatic sheet-feeder are piled upon the pile-table 2, as shown in Fig. 1. The printing-machine forms no part of the present invention, and consequently it is considered necessary to represent only just sufficient of it—for example, the impression-cylinder 3 and the control or stopping lever 4—to indicate the relative positions of it and the feeder. The pile-table 2 is vertically adjustable between the two side frames 5 5ª and by any of the well-known means is automatically raised step by step as the sheets are successively removed from the top of the pile. It is from this pile 1, generally from the top of it, that the feeder (forming no part of the present invention, and therefore not represented in the drawings) takes the sheets and feeds them forward to the first or receiving tape-drum 6, around which and the second or delivering tape-drum 7 pass the tapes 8 8, which carry the sheets down the tape-board 9 to the impression-cylinder 3, Figs. 1 and 2, of the printing-machine. The above-named feeder is required to take the sheets from the pile 1 only one at a time; but sometimes it takes two at a time. This taking two sheets at once is known in the printing trade as a "double," and to provide for the automatic stoppage of the feeder when such a double occurs the following mechanism is provided: One or more forwardly-curved and pointed shoes 10 (only one is represented in the drawings) are supported on a transverse rod or shaft 11, capable of rocking in bearings 12 12 on the before-mentioned side frames 5 5ª. The toe 13 of each of the said shoes is normally situated to the rear of the gap between the tape-roller 6 and two adjacent coaxial guide-pulleys 14 14, mounted on a shaft 15, fitted at its two ends in the free ends of two swinging links 16 16, pivoted to brackets 17 17, fast to the side frames 5 5ª. The rocking shaft 11 is preferably hollow, and, as shown most clearly in Figs. 4, 5, and 6, each of the shoes 10 is attached to it by means of a split sleeve 18, which may be adjusted to any desired position on the shaft 11 and secured in such position by means of a clamping-screw 18ª. The shoe 10 is separate from the sleeve 18, to which it may be secured in various positions of adjustment by a clamping-screw 19, which passes through a slot in the upright stem of the shoe and engages with a screw-threaded hole in the sleeve 18. At its upper part the shoe 10 is provided with a forwardly-projecting perforated lug 20, traversed by an adjusting-screw 21, engaging with a screw-threaded hole in the sleeve 18. A spring 22 between the sleeve 18 and the lug 20 serves to raise the shoe 10 as the screw 21 is unscrewed from the sleeve 18, the clamping-screw 19 being at that time released, and subsequently tightened when the shoe has been adjusted to the desired position.

A lever-arm 23, fast on and projecting forwardly from the rocking shaft 11, has pivoted to its forward end the upper end of a link 24, whose lower end is pivoted to one arm 25 of a bell-crank lever 25 26, pivoted at 27 to the adjacent side frame 5. The lever-arm 26 is adapted, when the link 24 is raised, to push against a stud 28 on a link 29, which at one end is suspended by a link 30, pivoted to the adjacent frame 5, and at the other end is pivoted to the stop-motion lever 31. A counterpoise 32 on the rocking shaft 11 or the equivalent thereof tends to keep the shoe 10 rocked backward in the position indicated in dotted lines in Fig. 4, and thereby through the link 24 keeps an antifriction-roller 33 (pivoted on the lever-arm 25) in contact with a constantly-rotating cam 34. This cam is provided with a "drop" 34ª and is secured on a cam-shaft 35, supported in bearings in the side frames 5 5ª and by any convenient means rotated in the direction indicated by the arrow in Fig. 1 once for each sheet supplied by the feeder. The cam-drop 34ª is presented to the antifriction-roller 33, so as to allow the shoe 10 to assume the dotted position at the instant that a sheet is being delivered by the feeder to the receiving tape-drum 6. Each time a sheet 1 is fed to the tapes 8 8 the cam 34 raises the lever-arm 25 and through the link 24 and lever-arm 23 rocks the shaft 15 and moves forward the shoe 10 into the position in which it is represented in full lines in the various figures, in which position the toe 13 of the said shoe is in the vertical plane which contains the axes of the drum 6 and rollers 14. When the shoe 10 is in the last-mentioned position, there is sufficient space between the under surface of the toe 13 and the tape-drum 6 to allow of the free passage of only a single sheet at a time, (this adjustment having previously been determined by means of the screw 21,) and so long as the sheet-feeder delivers these sheets singly in proper succession the machine will continue working without interruption. Should, however, a double occur, the upper of the two sheets frictionally engages the toe of the shoe 10 and drags the said shoe forward to a position such, for example, as that indicated in dot- and-dash lines in Fig. 4, and thereby through the shaft 11, lever-arm 23, link 24, bell-crank lever 25 26, stud 28, link 29, and stop-motion lever 31 effect the stoppage of the machine, as hereinafter more particularly described.

For effecting the automatic stoppage of the machine in the event of a sheet not being received on the feed-board the following mechanism is provided: Close to the delivery end of the feed-board 9 one or more gates 36 36 are let into it, (two are represented in the drawings,) and a detector 37, having blades or fingers 38 38, adapted to enter the slots of each of the said grates, is pivoted by a shaft 39 in brackets 40 40, fixed near the edges of the feed-board 9. Over this same part of the feed-board 9 there is provided a curved plate 41, carried on a rod 42, supported in the brackets 40 40, which plate serves to guide the sheets onto the impression-cylinder 3. The detector-blades 38 38 pass through holes 43 in this plate 41. On one end of the shaft 39 is secured a lever-arm 44, whose vibrating end is pivoted to the upper end of an inclined push-rod 45, guided in a pivoted guide 46, and whose lower end bears against a lever-arm 47, pivoted at 48 to the adjacent side frame 5. This lever-arm 47 carries an antifriction-roller 49, engaged by a cam 50, fast on the before-described cam-shaft 35, and its vibrating end is adapted to engage a stud 51, fast to the before-described link 29. Once during each rotation of the cam-shaft 35 the cam 50 presents the drop 50ª of its periphery to the antifriction-roller 49; but if the sheets 1 are fed regularly to the feed-board 9 the roller 49 does not enter the said drop, being prevented from doing so by the detector-blades 38 bearing on and being supported by the sheet then beneath them. If, however, a sheet is not properly supplied to the feed-board 9, as soon as the drop 50ª of the cam 50 is presented to the antifriction-roller 49 the blades 38 of the then-unsupported detectors 37 37 fall through the openings of the grates 36, (the roller 49 entering the cam-drop 50ª,) and through the lever-arm 44, push-rod 45, lever-arm 47, stud 51, and link 29 the stop-motion lever 31 is operated to stop the machine. The detectors 37 37 are returned to their normal elevated position by the "rise" of the cam 50, acting on the antifriction-roller 49, after the machine is next started.

Either of the above-mentioned motions of the stop-motion lever 31 is caused to stop the feeder by opening its driving-clutch 52 and that of the printing-machine by the following means: The stop-motion lever 31 is pivoted at 53 to the adjacent side frame 5, and at its lower end it is connected, through a link 54, with one arm 55 of a bell-crank lever 55 56, pivoted at 57 to the side frame 5. The second lever-arm 56, as shown most clearly in Fig. 1, acts as a detent to a lever 58, which in turn acts as a detent to a weighted lever 59 59ª, which, like the lever 58, is pivoted to the frame 5. The lever 58 is provided with an inclined abutment 60, adapted to engage with a stud or projection 61 on the weighted lever 59 to hold the latter in its normal or "set" position, in which position it is represented in the drawings. 62 is a stop rigid on the frame 5 to prevent the lever 58 from moving beyond its "setting" position. At the end adjacent to the before-mentioned projection 61 the weighted lever 59 is adapted to engage a stud 63 on the link 64 of the ordinary hand-operated clutch-controlling mechanism, while at the other side of the fulcrum 65 of the said lever a stud 66 is provided to engage in the slot 67 of a link 68, pivoted to the stopping-lever 4 of the printing-machine. The upper end of the link 64 is provided with a slot 70, with which engages a pin 71 on the ordinary controlling-handle 72, and the lower end of the link is pivoted to a lever-arm 73, (hereinafter termed a "stopping-lever,") secured to a rocking shaft 74, which also carries another lever-arm 75, connected by a link 76 with the ordinary clutch-lever 77, controlling the clutch 52.

The upper end of the stop-motion lever 31 is formed with a curved cam-surface 78, which projects into the vertical path of an antifriction-roller 79, Fig. 1, carried on the pile-board 2. By this arrangement the said roller acts on the cam 78 and effects the stoppage of the feeder when the pile-board reaches its highest position and the sheets have all been removed therefrom. 80 is the guide-plate, against which the front of the pile 1 is stacked.

When the stop-motion lever 31 is operated in either of the ways previously described, the bell-crank detent-lever 55 56 is released from the lever 58, and the weight 59ᵃ on the lever 59 overcoming the resistance presented by the engagement of the projection 61 and abutment 60 forces the lever 58 into its inoperative position and through the stud 63, link 64, stopping-lever 73, shaft 74, lever-arm 75, link 76, and clutch-lever 77 opens or releases the clutch 52, and thereby stops the feeder. Simultaneous with this stoppage of the feeder the stud 66 on the weighted lever 59 59ᵃ acting upon the lower end of the slot 67 operates the stopping-lever 4, and thereby effects the stoppage of the printing-machine. The slot 67 allows of the stopping-lever 4 of the printing-machine being actuated by the attendant irrespective of the before-described automatic control mechanism. The slotted connection between the link 64 and handle 72 fulfils a similar function in respect of the feeder.

I claim—

1. In an automatic control mechanism for an automatic sheet-feeder and the machine it feeds, the combination with the vertically-adjustable pile-table, the two stopping-levers and the tape-drums of such feeder and machine, of two vertical links one pivoted to each stopping-lever, a loaded lever engaging the two links, a detaining-lever for the loaded lever, coöperating projections on these two levers for effecting said detention, a detent engaging the detaining-lever, a stop-action lever operatively connected with the detent, a link pivoted to the stop-action lever, a guide for guiding the link longitudinally, projections on the link, a pivoted bell-crank lever and a lever-arm adapted to engage the projections on the link, rotating cams engaging the said bell-crank lever and lever-arm, a rocking shaft over the receiving tape-drum, bearings for the rocking shaft, a lever-arm fast on the rocking shaft, a link operatively connecting said arm and the bell-crank lever, a split sleeve adjustable on the rocking shaft, a forwardly-projecting shoe adjustable on the split sleeve, and extending down close to the periphery of the receiving tape-drum, a push-rod abutting against the cam-engaged lever-arm, a lever-arm pivoted to the said push-rod, a rocking shaft fast to this lever-arm, detectors fast on the rocking shaft and adapted to bear on the sheets passing over the feed-table, grates in the feed-table for receiving the detectors, and a guide-plate over the grates with perforations for the passage of the detectors substantially as set forth.

2. In automatic control mechanism for an automatic sheet-feeder and the machine it feeds, the combination with the two stopping-levers and the vertically-adjustable pile-table of the feeder and machine, of two vertical links one pivoted to each stopping-lever, a loaded lever engaging the two links, a detaining-lever for the loaded lever, coöperating projections on these two levers for effecting said detention, a detent engaging the detaining-lever, a stop-action lever operatively connected with the detent, a cam on the stop-action lever and a projection on the pile-table adapted to engage the said cam for releasing the loaded lever substantially as set forth.

3. In automatic control mechanism for an automatic sheet-feeder and the machine it feeds, the combination with the tape-drums, the stopping-levers and the stop-action lever operatively connected with the said stopping-levers, of a link pivoted to the stop-action lever, a guide for guiding the link longitudinally, a projection on the link, a pivoted bell-crank lever adapted by one arm to engage the projection on the link, a rotating cam engaging the other arm of the bell-crank lever, a rocking shaft over the receiving tape-drum, bearings for the rocking shaft, a lever-arm fast on the rocking shaft, a link operatively connecting said arm with the bell-crank lever and a shoe on the rocking shaft extending down close to the periphery of the receiving tape-drum, substantially as set forth.

4. In automatic control mechanism for an automatic sheet-feeder and the machine it feeds, the combination with the feed-table, the stopping-levers and the stop-action lever operatively connected with the said stopping-levers, of a link pivoted to the stop-action lever, guides for guiding the link longitudinally, a projection on the link, a lever-arm adapted to engage the said projection, a rotating cam engaging the lever-arm, a push-rod abutting against the lever-arm, a lever-arm pivoted to the push-rod, a rocking shaft fast to this lever-arm, a detector fast on the rocking shaft and adapted to bear on the sheets passing over the feed-table and a grate in the feed-table for receiving the detector substantially as set forth.

5. In automatic control mechanism for an automatic sheet-feeder, the combination with the tape-drums, the stopping-lever and the stop-action lever operatively connected with the said stopping-lever, of a link pivoted to the stop-action lever, a guide for guiding the link longitudinally, a projection on the link, a pivoted bell-crank lever adapted by one arm, to engage the projection on the link, a rotating cam engaging the other arm of the bell-crank lever, a rocking shaft over the receiving tape-drum, bearings for the rocking shaft, a lever-arm fast on the rocking shaft, a link operatively connecting said arm with the bell-crank lever and a shoe on the rocking shaft extending down close to the periphery of the receiving tape-drum, substantially as set forth.

6. In automatic control mechanism for an automatic sheet-feeder, the combination with the feed-table, the stopping-lever and the stop-action lever operatively connected with the said stopping-lever, of a link pivoted to the said stop-action lever, guides for guiding the link longitudinally, a projection on the link, a lever-arm adapted to engage the said projection, a rotating cam engaging the lever-arm, a push-rod abutting against the lever-arm, a lever-arm pivoted to the push-rod, a detector fast on the rocking shaft and adapted to bear on the sheets passing over the feed-table and a grate in the feed-table for receiving the detector substantially as set forth.

7. In automatic control mechanism for an automatic sheet-feeder, the combination with the tape-drums, the stopping-lever and the stop-action lever operatively connected with the stopping-lever, of a link pivoted to the stop-action lever, a projection on the link, a pivoted bell-crank lever adapted by one arm, to engage the projection on the link, a rotating cam engaging the other arm of the bell-crank lever, a rocking shaft over the receiving tape-drum, a lever fast on the rocking shaft, a link operatively connecting said arm with the bell-crank lever and a shoe on the rocking shaft extending down close to the periphery of the receiving tape-drum, the said shoe and rock-shaft being rocked by the cam backward and forward a definite distance for each sheet delivered by the feeder and being free to swing a farther distance in one direction to effect the operation of the link projection and consequently the stoppage of the feeder substantially as set forth.

In testimony that I claim the foregoing as my invention I have hereunto signed my name in the presence of two subscribing witnesses.

EDWARD THOMAS CLEATHERO.

Witnesses:
WARWICK H. WILLIAMS,
WALTER J. SKERTEN.